(12) United States Patent
Mailaender

(10) Patent No.: US 9,272,673 B2
(45) Date of Patent: Mar. 1, 2016

(54) SYSTEM CONSISTING OF ROOF LINER AND CASSETTE

(71) Applicant: Johnson Controls Interiors GmbH & Co. KG, Grefrath (DE)

(72) Inventor: Ralf Mailaender, Bettendorf (LU)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 0 days.

(21) Appl. No.: 14/365,810

(22) PCT Filed: Dec. 17, 2012

(86) PCT No.: PCT/EP2012/075753
§ 371 (c)(1),
(2) Date: Jun. 16, 2014

(87) PCT Pub. No.: WO2013/087923
PCT Pub. Date: Jun. 20, 2013

(65) Prior Publication Data
US 2014/0354016 A1 Dec. 4, 2014

(30) Foreign Application Priority Data
Dec. 16, 2011 (DE) .......................... 10 2011 121 178

(51) Int. Cl.
*B60R 13/02* (2006.01)
*B29D 99/00* (2010.01)
*B29L 31/30* (2006.01)

(52) U.S. Cl.
CPC .......... *B60R 13/0231* (2013.01); *B29D 99/001* (2013.01); *B29L 2031/3055* (2013.01); *B60Y 2304/07* (2013.01); *Y10T 29/49622* (2015.01)

(58) Field of Classification Search
CPC .................................................... B60R 13/0231
USPC ........................ 296/39.1, 214, 216.06–216.09
See application file for complete search history.

(56) References Cited

U.S. PATENT DOCUMENTS

| | | | | |
|---|---|---|---|---|
| 4,718,714 A | * | 1/1988 | Tanino et al. | 296/214 |
| 4,923,245 A | * | 5/1990 | Kuwabara | 296/214 |
| 5,108,147 A | * | 4/1992 | Grimm et al. | 296/214 |
| 5,344,209 A | * | 9/1994 | Regner | 296/223 |
| 6,343,831 B1 | * | 2/2002 | Nabert et al. | 296/187.05 |
| 7,036,876 B2 | * | 5/2006 | Senoo et al. | 296/214 |
| 2009/0309392 A1 | | 12/2009 | Kujawa | |

FOREIGN PATENT DOCUMENTS

| | | |
|---|---|---|
| DE | 102008051705 A1 | 4/2010 |
| DE | 102008060678 A1 | 6/2010 |
| WO | 2010010733 A1 | 1/2010 |

OTHER PUBLICATIONS

International Search Report for application No. PCT/EP2012/075753 mailed Apr. 16, 2013.

* cited by examiner

*Primary Examiner* — Dennis H Pedder
(74) *Attorney, Agent, or Firm* — Fletcher Yoder, P.C.

(57) ABSTRACT

The present invention relates to a system consisting of a roof liner and a cassette, a method for producing the roof liner, and a method for securing a roof liner to a cassette, in particular a sliding-roof cassette.

22 Claims, 3 Drawing Sheets

SYSTEM CONSISTING OF ROOF LINER AND CASSETTE

CROSS REFERENCE TO RELATED APPLICATIONS

Figure 1:
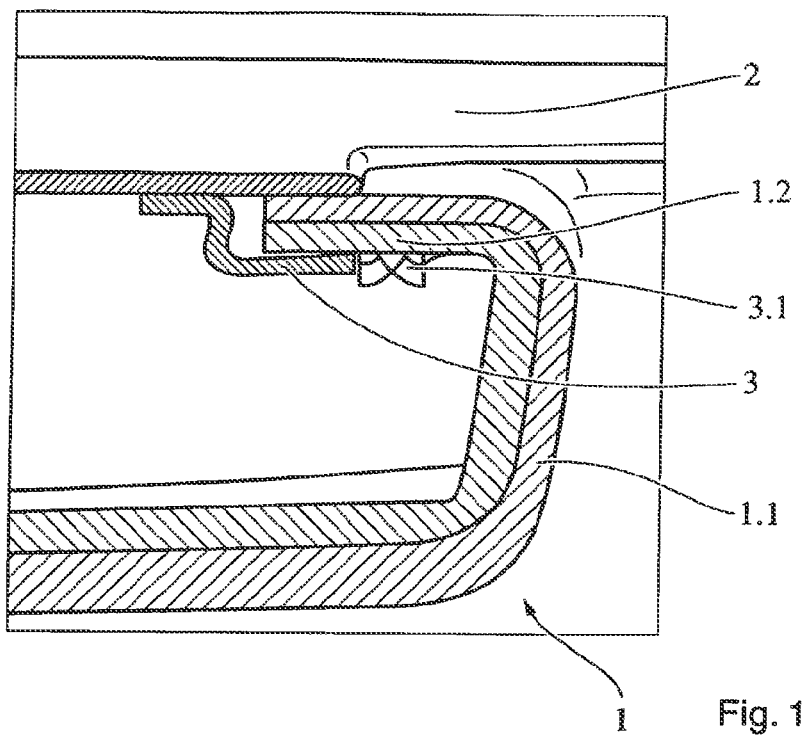

This application claims priority from and the benefit of PCT Application No. PCT/EP2012/075753, filed on Dec. 17, 2012; and German Patent DE 10 2011 121 178.4, filed on Dec. 16, 2011; which are herein incorporated by reference.

BACKGROUND

The present invention relates to a system consisting of a roof liner and a cassette as well as a method for manufacturing the roof liner and a method for attaching a roof liner to a cassette, particularly a sliding roof cassette.

Different roof liner variants are manufactured as interior trim components of vehicle roofs for each vehicle. In addition to the so-called full or standard roof liners which completely cover the entire inner side of the roof behind it, there are also variants which have one or more roof openings. These available variants, for example with a sliding roof or a panoramic roof, need to form an aesthetic closure in the connecting area with the cassette normally behind it, e.g. a sliding roof cassette, and be firmly attached to this unit. The skilled person thereby strives to design this connection to be as simple and durable as possible.

It was therefore the objective of the present invention to provide a system consisting of a roof liner having a roof opening and a cassette, said system being simple to manufacture and install.

This objective is accomplished by a system consisting of a roof liner having an edging in the region of a roof opening which is peripherally provided with a molding recessed from the passenger compartment and a subsequent foldback thereon, for example a flange, and a cassette having a support, at least in sections, particularly a support lug on which the foldback of the roof liner rests, wherein the support forms a slot with the cassette which at least partially accommodates the foldback of the roof liner.

The statements made here on this object of the present invention apply equally to the other objects of the present invention and vice versa.

SUMMARY

The present invention relates to a system consisting of a roof liner and a cassette. The roof liner preferably consists of a backing material as well as a decorative material. According to the invention, the roof liner comprises a roof opening, the edge region thereof being provided with a molding recessed from the passenger compartment; i.e. facing away from the interior of the vehicle. A foldback is attached to this molding. Although the foldback can be at any angle to the molding recessed from the passenger compartment, it is preferable for the foldback to be at an angle between 80° and 180° to the raised molding. It is particularly preferential for the angle to be 90° or 180°. The foldback can extend over the entire periphery of the roof opening or can be provided sectionally.

According to one preferential embodiment of the present invention, the roof liner has one or more recesses in the foldback which each preferably accommodate a respective projection provided on the cassette and/or the support. Alternatively or additionally, one or more positive and/or frictional connection means are provided on the foldback.

According to the invention, the roof liner is fixed to the body of a vehicle, particularly preferentially detachably, together with a cassette, particularly a sliding roof cassette. According to the invention, it is now provided for the cassette to comprise a support, particularly a support lug, on which the roof liner rests. This support can extend over the entire inner periphery of the cassette or only sections thereof. The support is preferably provided on two opposite sides of a substantially rectangular cassette. The support can comprise one or more recess(es), notch(es) and/or indentation(s) which each interact frictionally and/or positively with the foldback of the roof liner.

The support is preferably integrally formed with the cassette. For example, the cassette is extruded, whereby the support is integrally molded on the cassette.

In further accordance with the invention, the cassette and the support form a slot which receives at least sections of the roof liner foldback. The width of the slot can be of greater, equal or smaller dimension than the thickness of the foldback. In the latter case, the foldback is then clamped into the slot. The width of the slot can vary, particularly in the insertion direction of the roof liner foldback. For example, the width of the slot is initially larger, with respect to the insertion direction of the foldback, so as to facilitate the inserting of the foldback into the slot and then reduces, for example to clamp the foldback upon being inserted further into the slot or to reduce the play between the slot and the foldback. It is however also possible for the slot to widen in the insertion direction. Preferably the ingress widens, particularly elastically, upon the inserting of the foldback.

In accordance with another preferred embodiment, the foldback comprises a positive and/or frictional connection means, particularly of integral design, which interacts with a recess in the cassette, particularly the sliding roof cassette, or the support. The positive and/or frictional means preferably interacts with the recess in a latching manner. The positive and/or frictional means is preferably a molding which is preferably molded into the roof liner.

A method for manufacturing a roof liner is a further object of the present invention in which a raised molding and a subsequent foldback thereon is formed peripherally in the region of the edge of a roof liner recess, wherein one or more recess(es) are/are to be incorporated into the foldback.

The statements made here on this object of the present invention apply equally to the other objects of the present invention and vice versa.

The recess is preferably incorporated, for example cut or punched by means of a water jet or laser beam, prior to the foldback being brought into its final position.

It is particularly preferential for the foldback to be cut prior to being brought into its final position. Preferably the introducing of the recess and the cutting occur in essentially the same work step, particularly preferentially simultaneously.

The foldback can be connected, for example materially bonded, to the raised molding. The foldback is essentially brought into its final position by plastic deformation. Preferably, the foldback does not lie or does not lie completely on the raised molding subsequent the deformation and can be bent, particularly elastically, toward the raised molding when the roof liner is fitted to the cassette. This creates a pretensioning to counter the roof liner from disengaging from the cassette.

Preferably pressure and/or temperature is employed to deform the material from which the roof liner is manufactured.

The recess is preferably only provided sectionally in the region of the foldback. It is particularly preferential for the foldback to comprise a plurality of recesses which are preferably at least partly equidistantly arranged from one another.

Alternatively or additionally to these recesses which interact in particular with engaging means, the foldback can be provided with punch markings, for example during the molding of the roof liner, which prevent the foldback lug from slipping out accidentally, for example together with positive-fit molded engaging means of the sliding roof cassette. These punch markings can also be used additionally to the combination of recesses and engaging means.

The forces which cause the headliner to slip out of the slotted recess can result for example due to pressure on the upper edge of the headliner or by this edge being pulled.

A further object of the present invention is a method for attaching the roof liner to a cassette, particularly a sliding roof cassette, in which the foldback is at least partially inserted into the cassette and the foldback thereby penetrates into the slot between the cassette and the support.

The statements made here on this object of the present invention apply equally to the other objects of the present invention and vice versa.

The roof liner, particularly the foldback, preferably deforms elastically when the foldback is being inserted into the cassette. This elastic deformation preferably reverts back, preferably only partially, particularly preferably completely, when the foldback has at least partially penetrated the slot. The roof liner is preferably slid into the cassette from below until the foldback is disposed above the support and then moved downward again. During the downward movement, the foldback then continues to penetrate into the slot between the cassette and the support.

DRAWINGS

The following will draw on FIGS. 1-4c in defining the invention. These details are only examples and do not limit the scope and nature of the invention. The description applies to all the objects of the present invention equally.

Figure 2:
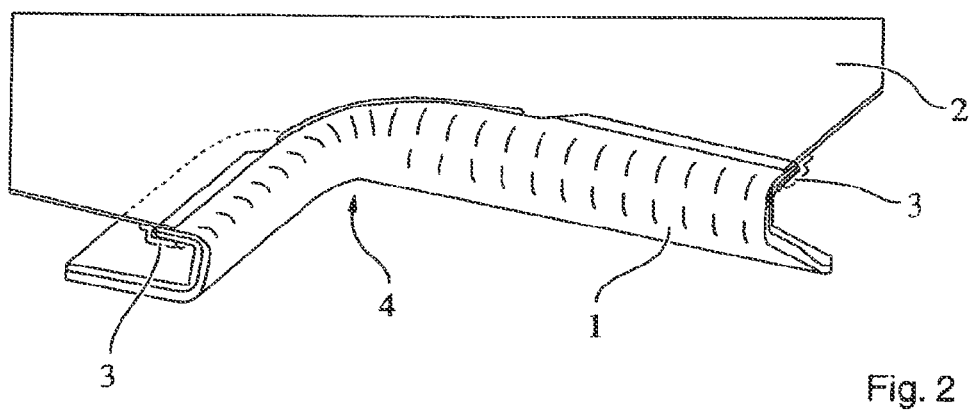
Figure 3A:
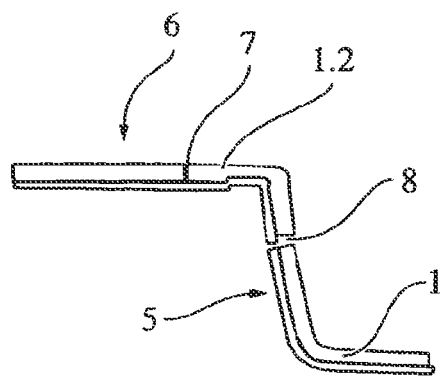
Figure 3B:
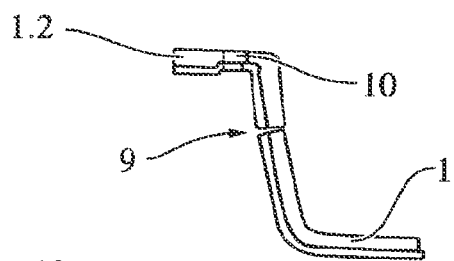
Figure 3C:
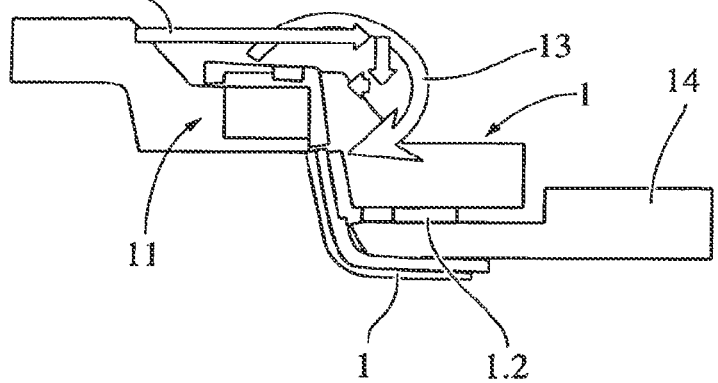
Figure 4A:
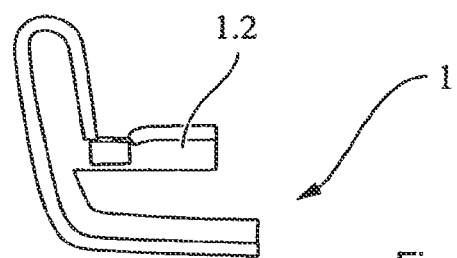
Figure 4B:
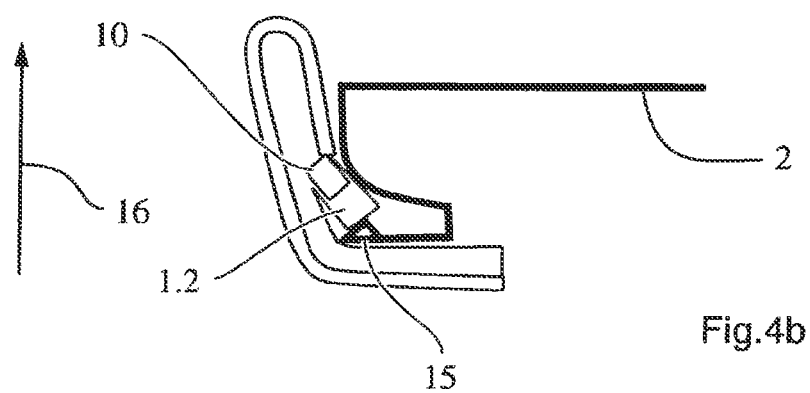
Figure 4C:
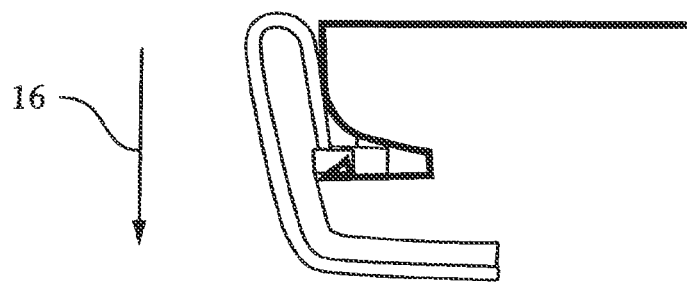

FIGS. 1 and 2 show the system according to the invention.
FIGS. 3A-C show the manufacturing of the roof liner.
FIGS. 4A-C show the mounting of the roof liner to the roof cassette.

DETAILED DESCRIPTION

FIGS. 1 and 2 show the system according to the invention consisting of a roof liner 1 and a cassette 2, particularly a sliding roof cassette. The roof liner preferably consists of a backing material and a decorative material facing the passenger interior. In the region of an opening, provided for example for a sliding or a panoramic roof, the roof iner 1 comprises a first raised molding 1.1 to which a foldback 1.2 is attached. In the present case, the molding 1.1 is provided peripherally around the recess. The foldback 1.2 is preferably likewise provided peripherally around the molding, although predominantly extends at least on the straight edges of the recess. A transition to a materially bonded 180° foldback can also occur at the corners of the recess depending on the radius of the corner, the elasticity of the decorative finishing and the in situ mass of the backing material. A support 3 is preferably provided integrally on the cassette 2 of the inventive system so as to create a slot between the underside of the cassette 1 and the upper side of the support 3 into which the foldback 1.2 is inserted when the roof liner is fit to the cassette. The slot is preferably dimensioned such that it clamps at least sections of the foldback 1.2. To this end, the support 3 can comprise for example a positive and/or frictional connection means which interacts with the roof liner. The support 3 can alternatively or additionally be elastically pretensioned toward the foldback, for example by at least sections of the slot width being smaller than the thickness of the foldback 1.2. The support 3 can be provided peripherally around the entire cassette or only sections thereof. The support is preferably arranged on respective opposite sides of a cassette of e.g. square or rectangular configuration.

FIGS. 3a-c show the manufacturing of a foldback. First, as FIG. 3a depicts, the edge region of the recess is formed in the roof liner 1. This forming is preferably effected by pressure and/or temperature. Thereafter, as likewise depicted, the roof liner is peripherally cut along cutting edge 7, whereby wastage 6 results. Simultaneously or thereafter, recess 10 is worked into the foldback 1.2, for example cut by means of a water jet or laser or punched. For the foldback, the foldback tool 11 is moved as indicated by arrow 12. This movement results in a substantially circular movement of the foldback 1.2, in the present case about the foldback line 8 as indicated by arrow 13.

A hold-down device 14 can additionally be used to support the foldback if needed. The roof liner is preferably plastically deformed at least sectionally as depicted in FIGS. 3a-c such that the foldback remains in the position shown in FIG. 4a after the tools are withdrawn.

FIGS. 4a-c show the connection between the roof liner 1 and the roof cassette 2. To make this connection, the roof liner is inserted into the roof cassette from below until at least part of the foldback 1.2 is above the slot in the roof cassette 2 or above the support 3, which is symbolized in FIG. 4b by arrow 16. The roof liner is thereafter moved in the opposite direction, as indicated in FIG. 4c by arrow 16. By so doing, the front section of the foldback 1.2 slides into the slot until the recess 10 of the foldback interlocks with an engaging means 15 provided on the support 3 of the cassette.

The invention claimed is:

1. A system comprising:
    a roof liner comprising an edging in a region of a roof opening which is peripherally provided with a molding recessed from a passenger compartment and provided with a subsequent foldback thereon; and
    a cassette having a support, at least in sections, the support forming a slot with the cassette which accommodates at least sections of the foldback of the roof liner;
    wherein the roof liner has at least one recess in the foldback, the cassette comprises at least one locking catch, and the at least one locking catch engages the at least one recess upon insertion of the at least sections of the foldback into the slot to secure the roof liner to the cassette.

2. The system according to claim 1, wherein the support is provided on two opposite sides of a substantially rectangular cassette.

3. The system according to claim 1, wherein the support is integrally formed with the cassette.

4. The system according to claim 1, wherein the cassette is extruded and the support is integrally molded on the cassette.

5. The system according to claim 1, wherein the width of the slot is initially larger with respect to an insertion direction of the foldback.

6. A method, comprising:
    manufacturing a roof liner by forming a raised molding and a subsequent foldback thereon, and forming at least one recess in the foldback; and
    inserting the foldback into a slot of a cassette, wherein the cassette includes a support, at least in sections, and the support forms the slot with the cassette;

wherein the cassette comprises at least one locking catch, and the at least one locking catch engages the at least one recess upon insertion of the foldback into the slot to secure the roof liner to the cassette.

7. The method according to claim 6, wherein the at least one recess is formed prior to the foldback being brought into its final position.

8. The method according to claim 6, wherein the foldback is cut prior to being brought into its final position.

9. The method according to claim 8, wherein manufacturing the roof liner comprises cutting the foldback in a first work step, and forming the at least one recess in a second work step.

10. The method according to claim 6, wherein the at least one recess comprises a plurality of recesses, and the plurality of recesses are only provided sectionally in the region of the foldback.

11. A method for attaching a roof liner to a cassette, comprising inserting a foldback into a slot of the cassette, wherein the cassette includes a support, at least in sections, and the support forms the slot with the cassette;
wherein the liner includes at least one recess in the foldback, the cassette comprises at least one locking catch, and the at least one locking catch engages the at least one recess upon insertion of the foldback into the slot to secure the roof liner to the cassette.

12. The method according to claim 11, wherein the roof liner deforms elastically as the foldback is inserted into the slot, and the elastic deformation reverts at least partially back when the foldback has at least partially penetrated the slot.

13. The method according to claim 11, wherein the roof liner is slid into the cassette from below until the foldback is disposed above the support and then moved downward again.

14. The method according to claim 13, wherein the foldback continues to penetrate into the slot between the cassette and the support during the downward movement.

15. The system according to claim 1, wherein the slot extends inwardly from a peripheral edge of the cassette, and the foldback extends outwardly from a corresponding peripheral edge of the roof liner.

16. The system according to claim 15, wherein the peripheral edge of the cassette contacts the corresponding peripheral edge of the roof liner while the at least sections of the foldback are inserted into the slot.

17. The system according to claim 16, wherein the foldback and the slot are positioned above a substantially horizontal portion of the roof liner.

18. The method according to claim 6, wherein the slot extends inwardly from a peripheral edge of the cassette, the foldback extends outwardly from a corresponding peripheral edge of the roof liner, and the peripheral edge of the cassette contacts the corresponding peripheral edge of the roof liner while the foldback is inserted into the slot.

19. The method according to claim 11, wherein the slot extends inwardly from a peripheral edge of the cassette, the foldback extends outwardly from a corresponding peripheral edge of the roof liner, and the foldback and the slot are positioned above a substantially horizontal portion of the roof liner.

20. The system of claim 1, wherein the at least one locking catch is disposed on the support.

21. The system of claim 1, wherein the support is configured to urge the at least sections of the foldback against the cassette to clamp the foldback within the slot.

22. The system of claim 17, wherein the cassette includes a curved section positioned above the slot, and the curved section is configured to guide the at least sections of the foldback into the slot.

\* \* \* \* \*